US012613504B2

(12) United States Patent
Knatt

(10) Patent No.: US 12,613,504 B2
(45) Date of Patent: Apr. 28, 2026

(54) SYSTEMS AND METHODS FOR MANAGING LEASED APPLIANCES

(71) Applicant: True Manufacturing Company, inc., O'Fallon, MO (US)

(72) Inventor: Kevin Knatt, St. Louis, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 1010 days.

(21) Appl. No.: 17/584,518

(22) Filed: Jan. 26, 2022

(65) Prior Publication Data

US 2022/0253029 A1      Aug. 11, 2022

Related U.S. Application Data

(60) Provisional application No. 63/144,781, filed on Feb. 2, 2021.

(51) Int. Cl.
*G05B 19/042*          (2006.01)
(52) U.S. Cl.
CPC .... *G05B 19/042* (2013.01); *G05B 2219/2654* (2013.01)
(58) Field of Classification Search
CPC .......... G05B 19/042; G05B 2219/2654; G06Q 20/14; G06Q 20/308; G06Q 20/3829; G06Q 30/0645; F25D 29/00; F25D 29/005; F25D 2400/361; G06F 21/44; G06F 2221/2137; G06F 21/305; G07F 9/002; H04L 63/0428; H04L 67/01; F25B 2600/07; F25C 2600/04
See application file for complete search history.

(56) References Cited

U.S. PATENT DOCUMENTS

| | | | |
|---|---|---|---|
| 5,801,632 A | 9/1998 | Opal | |
| 6,060,987 A | 5/2000 | Marlia | |
| 6,150,935 A | 11/2000 | Anderson | |
| 6,370,890 B2 | 4/2002 | Roh et al. | |
| 6,393,848 B2 | 5/2002 | Roh et al. | |
| 6,442,952 B2 | 9/2002 | Roh et al. | |

(Continued)

FOREIGN PATENT DOCUMENTS

| | | |
|---|---|---|
| CN | 207247712 U | 4/2018 |
| CN | 207251677 U | 4/2018 |

(Continued)

OTHER PUBLICATIONS

Extended European Search Report from counterpart EP Application No. 22154821.7, mailed Jun. 7, 2022, 12 pages.

*Primary Examiner* — Ziaul Karim
(74) *Attorney, Agent, or Firm* — Stinson LLP

(57)          ABSTRACT

Appliances for use under appliance leasing agreements include a memory that stores a local parameter defining a lockout time at which the appliance will be locked out from performing an appliance leasing function and a controller that is configured to automatically switch the appliance from an operating mode to a locked mode at the stored lockout time. An asset management system for leased refrigeration appliances can include a remote server for sending a command to appliances which changes the lockout time stored in local memory. An encrypted key generator may also be used to enable a user to locally update the lockout time stored in the memory upon entry of an encrypted key.

9 Claims, 3 Drawing Sheets

(56)  References Cited

U.S. PATENT DOCUMENTS

| | | | |
|---|---|---|---|
| 6,502,411 B2 | 1/2003 | Okamoto | |
| 6,722,146 B2 | 4/2004 | Roh et al. | |
| 6,842,721 B2 | 1/2005 | Kim et al. | |
| 6,889,510 B2 | 5/2005 | Song et al. | |
| 6,892,545 B2 | 5/2005 | Ishikawa et al. | |
| 6,917,853 B2 | 7/2005 | Chirnomas | |
| 7,090,141 B2 | 8/2006 | Roh et al. | |
| 7,110,832 B2 | 9/2006 | Ghent | |
| 7,204,091 B2 | 4/2007 | Allison et al. | |
| 7,296,459 B2 | 11/2007 | Son et al. | |
| 7,490,477 B2 | 2/2009 | Singh et al. | |
| 7,552,029 B2 | 6/2009 | Elwood et al. | |
| 8,539,783 B1 | 9/2013 | Bunch | |
| 8,653,949 B2 | 2/2014 | Lee et al. | |
| 8,725,455 B2 | 5/2014 | Kriss | |
| 9,024,716 B2 | 5/2015 | Yum et al. | |
| 9,057,554 B2 | 6/2015 | Quinlan et al. | |
| 9,091,475 B2 | 7/2015 | Kang et al. | |
| 9,279,611 B2 | 3/2016 | Tan et al. | |
| 9,441,991 B2 | 9/2016 | Haga et al. | |
| 9,451,031 B2 | 9/2016 | Graziano et al. | |
| 9,644,886 B2 | 5/2017 | Shim | |
| 9,863,694 B2 | 1/2018 | Broadbent | |
| 10,142,820 B2 | 11/2018 | Root | |
| 10,153,915 B2* | 12/2018 | Doberstein | H04L 67/55 |
| 10,238,259 B2* | 3/2019 | Langhammer | A47L 9/28 |
| 10,256,982 B2 | 4/2019 | Rahman et al. | |
| 10,321,182 B2 | 6/2019 | Herz | |
| 10,341,133 B2 | 7/2019 | Wouhaybi et al. | |
| 10,361,999 B2 | 7/2019 | Vazquez et al. | |
| 10,380,863 B2 | 8/2019 | Wedig et al. | |
| 10,420,151 B2 | 9/2019 | Zakaria | |
| 10,444,868 B2 | 10/2019 | Lee | |
| 10,465,960 B2 | 11/2019 | Prabhakaran et al. | |
| 10,492,072 B1 | 11/2019 | Sokolov et al. | |
| 10,506,019 B2 | 12/2019 | Brian | |
| 10,510,110 B2 | 12/2019 | Takahashi et al. | |
| 10,511,950 B2 | 12/2019 | Maier et al. | |
| 10,531,247 B2 | 1/2020 | Kashef | |
| 10,536,527 B2 | 1/2020 | Ocejo et al. | |
| 10,540,871 B2 | 1/2020 | Wedig et al. | |
| 10,547,498 B1 | 1/2020 | Garner et al. | |
| 10,563,899 B2 | 2/2020 | Wilson | |
| 10,567,567 B2 | 2/2020 | Seo et al. | |
| 10,578,353 B2 | 3/2020 | Seidl et al. | |
| 10,673,707 B2 | 6/2020 | Dhanabalan et al. | |
| 10,722,096 B2 | 7/2020 | Gary, Jr. et al. | |
| 10,764,374 B1 | 9/2020 | Marquardt et al. | |
| 10,769,916 B2 | 9/2020 | Kim et al. | |
| 10,769,929 B2 | 9/2020 | Qiu et al. | |
| 2003/0000233 A1 | 1/2003 | Mazereeuw | |
| 2003/0033165 A1 | 2/2003 | Inoue et al. | |
| 2003/0074912 A1 | 4/2003 | Maeda et al. | |
| 2004/0016242 A1 | 1/2004 | Song et al. | |
| 2005/0008539 A1 | 1/2005 | Matsuura et al. | |
| 2005/0120727 A1 | 6/2005 | Flinner et al. | |
| 2005/0132725 A1 | 6/2005 | Menten et al. | |
| 2006/0123806 A1 | 6/2006 | Vassilev et al. | |
| 2006/0143520 A1 | 6/2006 | Matsushima et al. | |
| 2006/0146773 A1 | 7/2006 | An et al. | |
| 2006/0150662 A1 | 7/2006 | Lee et al. | |
| 2006/0272341 A1 | 12/2006 | Shin et al. | |
| 2006/0276932 A1* | 12/2006 | Pearson | F25C 1/00 62/135 |
| 2008/0250324 A1 | 10/2008 | Ito | |
| 2009/0024726 A1 | 1/2009 | Jeon et al. | |
| 2009/0072962 A1 | 3/2009 | Hitchin | |
| 2009/0273470 A1 | 11/2009 | Sinkevicius et al. | |
| 2009/0277199 A1 | 11/2009 | Manas et al. | |
| 2010/0152904 A1 | 6/2010 | Kawaguchi et al. | |
| 2011/0132009 A1 | 6/2011 | Lee | |
| 2011/0228319 A1* | 9/2011 | Miyazawa | G06F 3/1259 358/1.15 |
| 2012/0212771 A1* | 8/2012 | Goddard | G06F 3/1255 358/1.15 |
| 2012/0262294 A1 | 10/2012 | Nikolovski | |
| 2014/0244825 A1 | 8/2014 | Cao et al. | |
| 2015/0096352 A1 | 4/2015 | Peterson et al. | |
| 2015/0170503 A1 | 6/2015 | Wedig et al. | |
| 2015/0285552 A1 | 10/2015 | Swaidan et al. | |
| 2016/0018158 A1 | 1/2016 | Yokoo et al. | |
| 2016/0134432 A1 | 5/2016 | Hund et al. | |
| 2016/0139067 A1 | 5/2016 | Grace | |
| 2016/0204953 A1 | 7/2016 | Kim et al. | |
| 2016/0239819 A1* | 8/2016 | Yamada | G06Q 20/209 |
| 2017/0076584 A1 | 3/2017 | Eskildsen et al. | |
| 2017/0152132 A1 | 6/2017 | Laible | |
| 2017/0169189 A1 | 6/2017 | Belz et al. | |
| 2017/0186079 A1 | 6/2017 | Kim et al. | |
| 2017/0250834 A1 | 8/2017 | Hsiao | |
| 2017/0292780 A1 | 10/2017 | Li | |
| 2017/0310498 A1 | 10/2017 | Brandman et al. | |
| 2018/0005307 A1 | 1/2018 | Abedin et al. | |
| 2018/0102572 A1 | 4/2018 | Wedig et al. | |
| 2018/0102918 A1 | 4/2018 | Amini et al. | |
| 2018/0137457 A1 | 5/2018 | Sachs et al. | |
| 2018/0176774 A1 | 6/2018 | Miller | |
| 2018/0187969 A1 | 7/2018 | Kim et al. | |
| 2018/0197175 A1 | 7/2018 | Groarke | |
| 2018/0211208 A1 | 7/2018 | Winkle et al. | |
| 2018/0306476 A1 | 10/2018 | Brady et al. | |
| 2018/0315200 A1 | 11/2018 | Davydov et al. | |
| 2018/0338280 A1 | 11/2018 | Zakaria et al. | |
| 2019/0003757 A1 | 1/2019 | Miros et al. | |
| 2019/0073800 A1 | 3/2019 | Lochny | |
| 2019/0133165 A1 | 5/2019 | Schmitz | |
| 2019/0174207 A1 | 6/2019 | Cella et al. | |
| 2019/0182259 A1 | 6/2019 | Qian et al. | |
| 2019/0182345 A1 | 6/2019 | Ji et al. | |
| 2019/0191284 A1 | 6/2019 | Tran et al. | |
| 2019/0245713 A1 | 8/2019 | Lo et al. | |
| 2019/0323767 A1 | 10/2019 | Meyers | |
| 2019/0333027 A1 | 10/2019 | Jones et al. | |
| 2019/0368805 A1 | 12/2019 | Lim et al. | |
| 2019/0390897 A1 | 12/2019 | Lee et al. | |
| 2020/0076640 A1 | 3/2020 | Han et al. | |
| 2020/0080769 A1 | 3/2020 | Han et al. | |
| 2020/0090192 A1 | 3/2020 | Sim et al. | |
| 2020/0096253 A1 | 3/2020 | Han et al. | |
| 2020/0097776 A1 | 3/2020 | Kim et al. | |
| 2020/0119946 A1 | 4/2020 | Ramirez et al. | |
| 2020/0124329 A1 | 4/2020 | Han et al. | |
| 2020/0132364 A1 | 4/2020 | Tran et al. | |
| 2020/0143294 A1 | 5/2020 | Brady et al. | |
| 2020/0219377 A1 | 7/2020 | Shoari et al. | |
| 2020/0220932 A1* | 7/2020 | Gardner | H04W 4/00 |
| 2020/0225626 A1 | 7/2020 | Huo et al. | |
| 2020/0248953 A1 | 8/2020 | Fujii | |
| 2020/0252231 A1 | 8/2020 | Nakashima | |
| 2020/0257321 A1 | 8/2020 | Ranjan et al. | |
| 2020/0260653 A1 | 8/2020 | Douglas et al. | |
| 2020/0278915 A1 | 9/2020 | Degaonkar et al. | |
| 2020/0285258 A1 | 9/2020 | Kates | |
| 2020/0295963 A2 | 9/2020 | Dulski et al. | |
| 2020/0322177 A1 | 10/2020 | Kim et al. | |
| 2021/0106023 A1* | 4/2021 | Elsom | A23G 9/22 |

FOREIGN PATENT DOCUMENTS

| | | | |
|---|---|---|---|
| CN | 108121213 A | 6/2018 | |
| CN | 109979107 A | 7/2019 | |
| JP | 2003233714 A | 8/2003 | |
| WO | 2002001920 A1 | 1/2002 | |
| WO | 2005057093 A1 | 3/2006 | |
| WO | 2010089193 A1 | 6/2010 | |
| WO | 2011030288 A1 | 3/2011 | |
| WO | 2012004747 A1 | 1/2012 | |
| WO | 2013040854 A1 | 3/2013 | |
| WO | 2013118142 A2 | 8/2013 | |
| WO | 2013139189 A1 | 9/2013 | |
| WO | 2014141538 A1 | 9/2014 | |
| WO | 2016131609 A1 | 8/2016 | |
| WO | 2017033240 A1 | 2/2017 | |
| WO | 2017100897 A1 | 6/2017 | |

(56)          References Cited

FOREIGN PATENT DOCUMENTS

| WO | 2017107398 A1 | 6/2017 |
| WO | 2017141265 A1 | 8/2017 |
| WO | 2017179188 A1 | 10/2017 |
| WO | 2017193234 A1 | 11/2017 |
| WO | 2017193235 A1 | 11/2017 |
| WO | 2017193236 A1 | 11/2017 |
| WO | 2017193237 A1 | 11/2017 |
| WO | 2017193238 A1 | 11/2017 |
| WO | 2018000986 A1 | 1/2018 |
| WO | 2018023434 A1 | 2/2018 |
| WO | 2018023435 A1 | 2/2018 |
| WO | 2018023436 A1 | 2/2018 |
| WO | 2018044091 A1 | 3/2018 |
| WO | 2018227714 A1 | 12/2018 |
| WO | 2019035109 A1 | 2/2019 |
| WO | 2019041962 A1 | 3/2019 |
| WO | 2019042408 A1 | 3/2019 |
| WO | 2019158754 A1 | 12/2019 |
| WO | 2020031433 A1 | 2/2020 |
| WO | 2020111961 A1 | 6/2020 |
| WO | 2020205820 A1 | 10/2020 |

* cited by examiner

410

SYSTEMS AND METHODS FOR MANAGING LEASED APPLIANCES

CROSS-REFERENCE TO RELATED APPLICATIONS

This application claims Priority to U.S. Provisional Application No. 63/144,781, filed Feb. 2, 2021 entitled Systems and Methods for Managing Leased Appliances which is hereby incorporated by reference in its entirety.

FIELD

The present disclosure generally pertains to systems and methods for managing leased appliances.

BACKGROUND

It is common for expensive equipment such as refrigeration appliances to be leased by the end user. For example, restaurants, grocers, hotels, and the like often lease refrigeration appliances such as commercial refrigerators, freezers, and ice makers. Under the terms of an appliance leasing agreement, the lessee is responsible to make periodic lease payments to a lessor. Conventionally, if a lessee stops making required payments under an appliance leasing agreement, the lessor's remedy is to repossess the leased appliance.

SUMMARY

In one aspect, a refrigeration appliance for use under an appliance leasing agreement comprises an appliance controller configured for selectively controlling the refrigeration appliance in an operating mode in which the appliance controller operates the refrigeration appliance for performing an appliance function and a locked mode in which the appliance controller prevents the refrigeration appliance from being operated to perform the appliance function. Memory stores a local parameter defining a lockout time at which the refrigeration appliance will be locked out from performing the appliance function. The appliance controller is connected to the memory for reading the local parameter from the memory. The controller is configured to operate the refrigeration appliance in the operating mode until the lockout time and to switch the refrigeration appliance to the locked mode at the lockout time.

In another aspect, a system for managing leased refrigeration appliances comprises an encrypted key generator. The encrypted key generator is configured to receive from a requester a key request containing an updated lockout time for a refrigeration appliance. The encrypted key generator is configured to generate an encrypted key in response to the key request and to provide the encrypted key to the requester. The encrypted key is configured to cause the refrigeration appliance to change a lockout time stored in memory to the updated lockout time when the encrypted key is entered into a user interface associated with the appliance.

In another aspect, an asset management system for leased refrigeration appliances comprises a plurality of refrigeration appliances. An asset management server is remote from the plurality of refrigeration appliances. A client-server network connects the asset management server to the plurality of refrigeration appliances. The asset management server is configured to selectively send a command to any of the plurality of refrigeration appliances to set when the refrigeration appliance will be locked out from performing one or more of its appliance functions.

In another aspect, a method of managing a leased appliance comprises setting a local parameter on the leased appliance to automatically cause the appliance to switch from an operating mode to a locked mode at a time associated with an initial payment made under an appliance leasing agreement. The local parameter is updated to a time associated with a second payment made under the appliance leasing agreement after the second payment is made.

In another aspect, a method of managing a refrigeration appliance being leased comprises establishing a connection between the refrigeration appliance and the remote asset management server on a client-server network. The asset management server determines that a lease agreement governing the appliance has been broken. In response to said determining, a lock command is sent from the asset management server to the refrigeration appliance over the client-server network. The lock command is configured to cause a controller of the refrigeration appliance to switch from an operating mode to a locked mode.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

The present inventors have recognized a need for a technical system that promotes better lease compliance, in order to mitigate against involuntary repossession of appliances. When the lease for a refrigeration appliance is broken by the lessee, currently, a lessor must undertake the substantial expense and hassle of repossessing the appliance. Meanwhile, the breaching lessee can continue its use of the appliance unabated. The inventors believe that lease compliance might be improved if the lessor was provided with the technical capability of reducing the functionality of the leased appliance upon violation of the lease without requiring the lessor to physically access or repossess the appliance.

Figure 1:
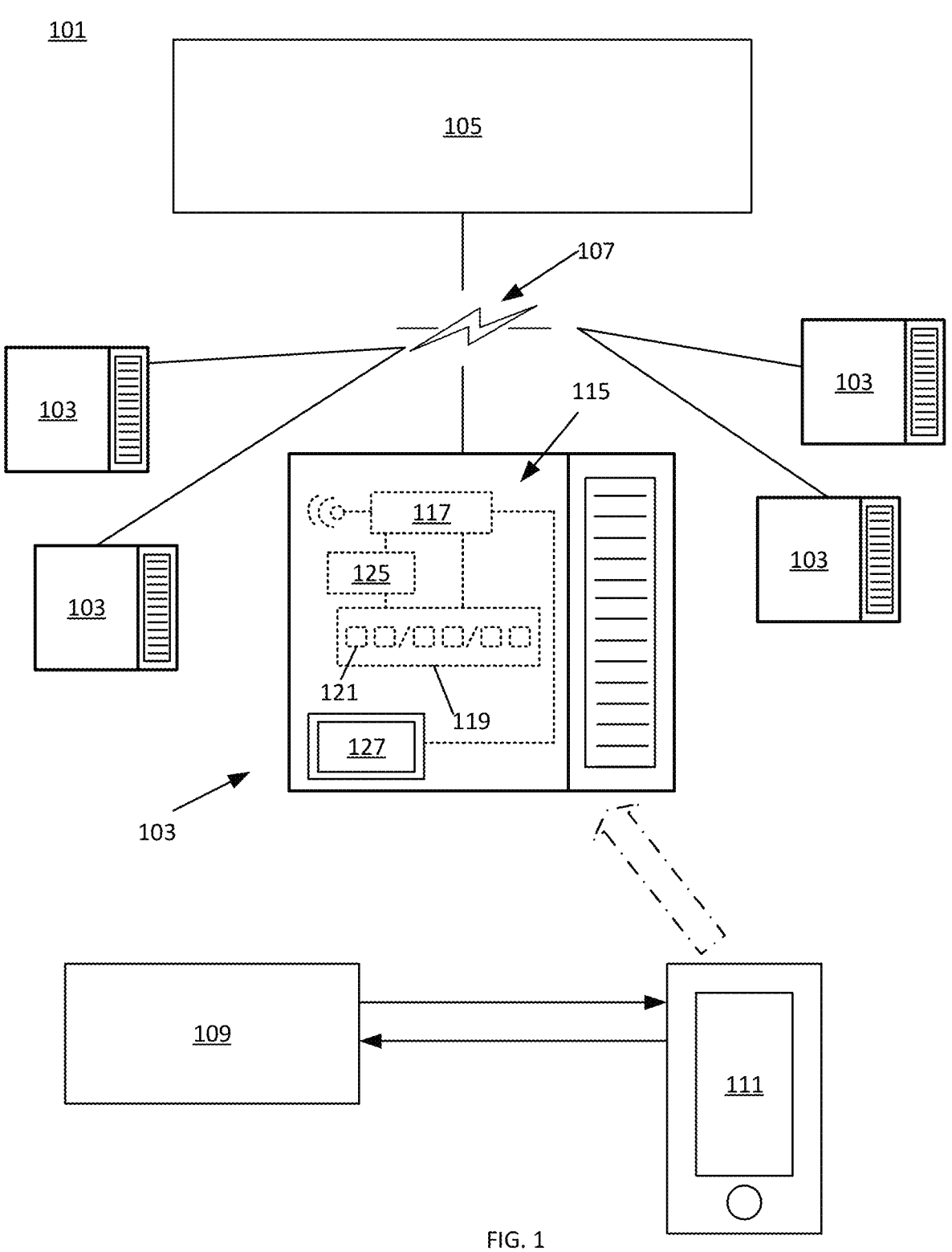
FIG. 1 is a schematic block diagram of an asset management system for managing a plurality of leased appliances.

Referring to FIG. 1, an exemplary system for managing leased appliances (e.g., an asset management system) is generally indicated at reference number 101. The system broadly includes a plurality of leased refrigeration appliances 103, a remote asset management server 105, a client-server network 107 connecting the refrigeration appliances to the asset management server, a remote encrypted key generator 109, and one or more requester devices in configured to communicate with the encrypted key generator. As will be explained in further detail below, the system 101 broadly enables a lessor to use the asset management server 105 to cause the refrigeration appliances 103 to lose functionality when a lease is violated. Furthermore, the illustrated appliances 103 are equipped with local control systems that automatically limit use of an appliance when lease payments become delinquent. The asset management system

100 provides a mechanism for locally adjusting each appliance to reflect updated payments made under an appliance leasing agreement. In particular, a user can input an encrypted key provided by the encrypted key generator 109 to update the control system in accordance with payments made under the lease.

In the illustrated embodiment, each of the refrigeration appliances 103 is depicted as being a commercial ice maker. An exemplary embodiment of a commercial ice maker as shown herein is described more fully in U.S. patent application Ser. No. 16/823,002, filed Mar. 18, 2020, and entitled ICE MAKER, which is hereby incorporated by reference in its entirety. However, it will be understood that other types of refrigeration appliances, such as commercial refrigerators, commercial freezers, and residential refrigeration appliances can also be used in the system 101 without departing from the scope of the disclosure. In general, certain refrigeration appliances in the scope of this disclosure will comprise a refrigeration system (e.g., a vapor-compression system, thermoelectric system, and/or other suitable refrigeration system) that is configured to cool a particular area associated with the appliance. In the case of the ice makers 103, each refrigeration system (not shown) is configured to cool an ice formation device where water collects and is chilled to freeze into collectable ice. In the case of certain other types of refrigeration appliances, the refrigeration system will cool a defined storage area, such as the space inside a reach-in cabinet, display cabinet, drawer, walk-in compartment, etc. Refrigeration appliances in the scope of this disclosure can also include a control system having any of the features of control systems 115 of the ice makers 103, discussed hereinafter. It is further contemplated that other types of appliances, such as cooking appliances, cleaning appliances (e.g., commercial sanitizing devices such as ozone sanitizers), medical appliances and water-using appliances, could be included in the asset management system without departing from the scope of the disclosure. In general, appliances in the scope of this disclosure will typically comprise an electronic local control system that includes one or more electronically controllable parts which carry out one or more appliance functions, one or more components that output a signal representing a real-time indication of how one or more aspects of the appliance is operating or performing, and a local controller for operating the controllable parts and/or receiving operating data from the signal outputting components of the appliance. Furthermore, appliances in the scope of this disclosure will typically comprise a network interface or port (e.g., a cellular data antenna or Wi-Fi antenna) that enables the appliances to connect to the asset management system network and communicate with the remote asset management system server.

The illustrated control system 115 includes an appliance controller 117 configured for controlling the appliance 103. In general, the appliance controller 117 comprises a processor for controlling the appliance. The processor may be, for example, a commercially available microprocessor, an application-specific integrated circuit (ASIC) or a combination of ASICs, which are designed to achieve one or more specific functions, or enable one or more specific devices or applications. Accordingly, the appliance controller 117 may include any type of processor typically used in electronically controlled appliances.

The illustrated appliance controller 117 is configured to selectively control the refrigeration appliance 103 in (i) an operating mode in which the appliance controller operates the refrigeration appliance for performing an appliance function and (ii) a locked mode in which the appliance controller prevents the refrigeration appliance from being operated to perform the appliance function. In the illustrated example of the ice makers 103, in the operating mode, the appliance controller is configured to operate the appliance to freeze water into ice and collect the ice. For instance, in the case of the batch-type ice maker described in U.S. patent application Ser. No. 16/823,002, the appliance controller 117 operates a refrigeration system to cool a freeze plate and warm the freeze plate in a series of alternating freeze cycles and harvest cycles and concurrently operates a water system to distribute liquid water along the freeze plate during the freeze cycles so that the water freezes into ice that can be released from the freeze plate during each following harvest cycle. By contrast, in a locked mode the appliance controller 117 prevents the refrigeration system from cooling the freeze plate to a freezing temperature, prevents the refrigeration system from warming the freeze plate to a sufficient temperature to harvest the ice, and/or prevents the water system from distributing water onto the freeze plate for making ice.

It is contemplated that refrigeration appliances in the scope of this disclosure can conduct operating and locked modes in other ways, depending on the type of refrigeration appliance in question and the preferred locked mode characteristics of the appliance. In the case of a nugget-type ice maker, the appliance controller could, in the operating mode, operate a refrigeration system, water system, and auger in coordination to produce nugget ice when called upon; whereas in the locked mode, the appliance controller could prevent any one or more of the refrigeration system, the water system, and the auger from operating so that no ice is made. In the case of a refrigerated storage appliance, such as a reach-in cooler, display cooler, walk-in cooler, refrigerated drawer(s), etc., in certain embodiments, the appliance controller could operate the refrigeration system to cool the associated space in the operating mode; whereas in the locked mode, the appliance controller could prevent the refrigeration system from operating altogether or to its full capacity. In other embodiments, the appliance controller could operate an automated door or drawer lock of a refrigerated appliance differently in the operating mode and the locked mode. An exemplary embodiment of an automatic door lock of a refrigeration appliance is disclosed in U.S. application Ser. No. 17/373,402, which is hereby incorporated by reference in its entirety. For instance, in the operating mode the appliance controller could maintain the automated door lock in an unlocked configuration so that a user can access the refrigerated interior of the appliance. By contrast, in the locked mode, the appliance controller could maintain the automated door lock in a locked configuration so that access to the refrigerated interior is restricted.

Referring to the refrigeration appliance 103 depicted in FIG. 1, the illustrated control system 115 further comprises a memory 119 (e.g., tangible machine-readable memory) which stores a local parameter 121 that defines a lock at time at which the appliance will be automatically locked out from performing one or more of its refrigeration functions as described above. In the illustrated embodiment, the local parameter 121 defines a predefined month, predefined day, and predefined year at which the appliance 103 will be automatically locked out from performing one or more of its refrigeration functions. In general, the appliance controller 115 is connected to the memory 119 for reading the local parameter 121 from the memory. In an exemplary embodiment, the predefined month, predefined day, and predefined year are accessed from the discrete registers of the appliance controller. The appliance controller 115 is configured to operate the refrigeration appliance in the operating mode until the lockout time defined in the local parameter 121 and automatically switch the appliance to the locked mode at the lockout time. It will be appreciated that other ways of storing and accessing a predefined time at which the appliance will automatically become locked out can also be used without departing from the scope of the disclosure.

The illustrated control system 115 further comprises a lockout time change module 125, which generally comprises a circuit for, or processor executing stored instructions for, adjusting the local parameter 121 stored in the memory 119 in response to a time change input. In one embodiment, the appliance controller 117 executes the lockout time change module 125. In another embodiment, the lockout time change module 125 is executed by a separate processor or circuit that is in communication with the appliance controller 117. Regardless, the time change module 125 is configured to receive a lockout time change input, and in response to receiving the lockout time change input, change the lockout time stored in the memory 119. In the illustrated embodiment, the lockout time change module 125 is in communication with a user interface 127 (e.g., touchscreen interface or push-button interface) of the refrigeration appliance 103 to receive a lockout time change input from the user interface. In other words, the illustrated refrigeration appliance 103 is configured to allow a local user to enter a local input to the user interface 127, and based on the local input, the time change module 125 can change the locally stored parameter 121 defining the time at which the appliance will be automatically locked.

Figure 2:
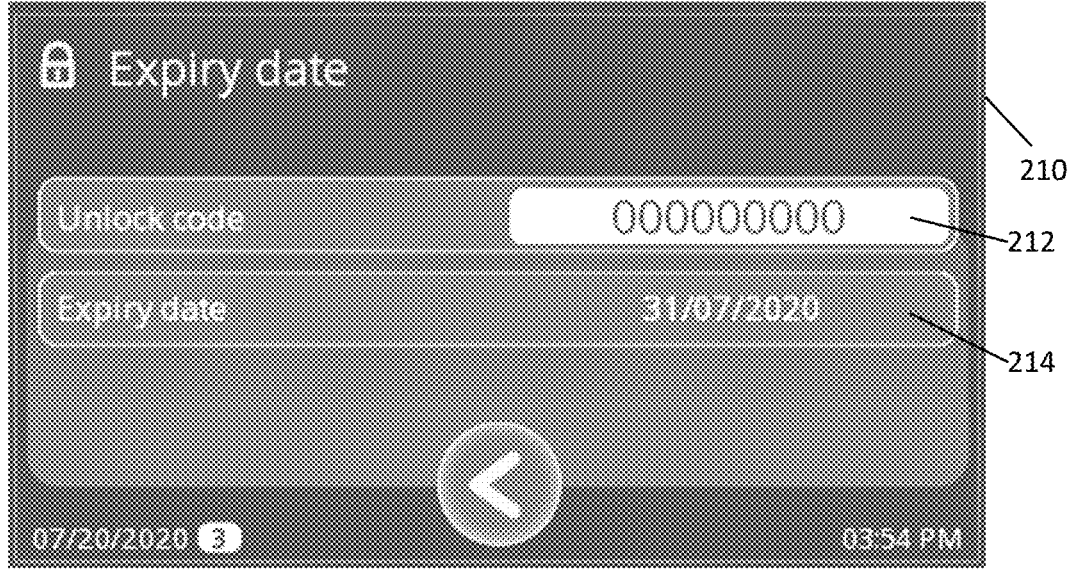
FIG. 2 is a screen of a user interface of a leased appliance including an indication of a lockout date and an item for enabling entry of an input for changing the lockout date.
Figure 3:
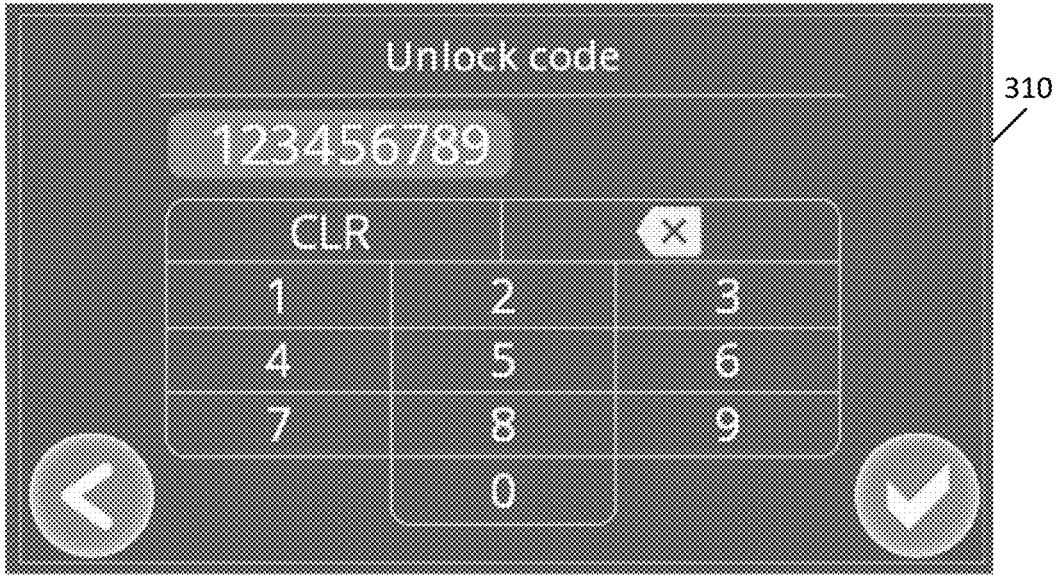
FIG. 3 is a screen of the user interface with a number pad for entering the input for changing the lockout date.
Figure 4:
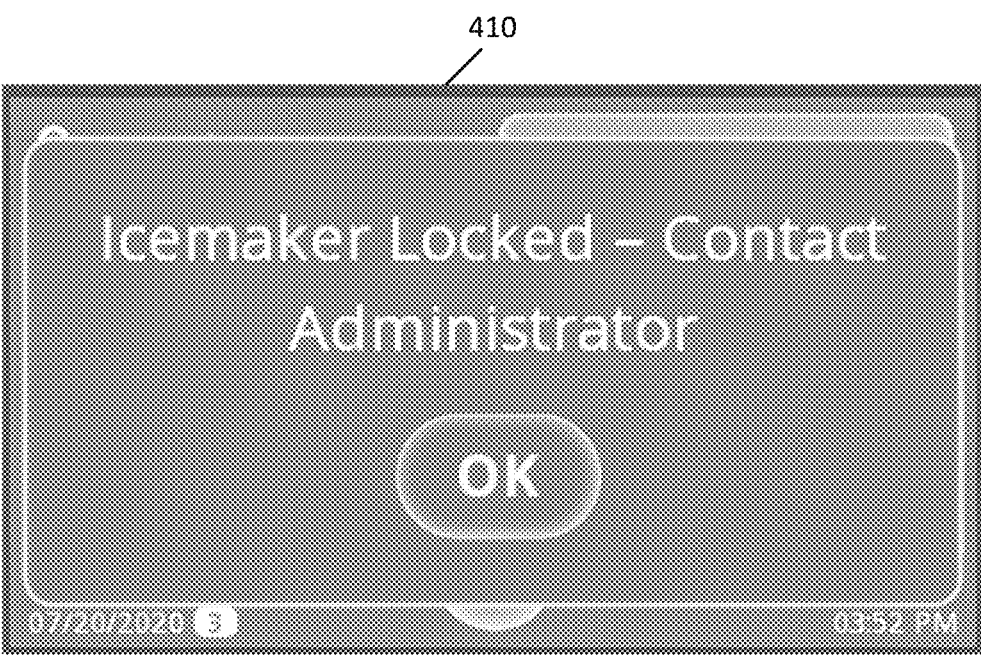
FIG. 4 is a lock screen of the user interface.

In one or more embodiments, the time change module 125 is configured to require an encrypted key to make a change to the lockout time parameter 121 based on an input to the user interface 127. Accordingly, in an exemplary embodiment, the time change input provided to the user interface 127 comprises an encrypted key, and the lockout time change module 125 is configured to execute a decryption algorithm to decrypt the encrypted key and determine an updated lockout time for changing the parameter 121 stored in the memory 119. As will be explained in further detail below, the requirement for an encrypted key to make a local change to the lockout time parameter 121 can provide a lessor with substantial control over when the refrigeration appliance 103 switches from the operating mode to the locked mode, even when the lessor does not have direct physical access to the appliance or network access to the device as described below. It can be seen that, in one or more embodiments, each of a plurality of refrigeration appliances 103 in the asset management system 101 is configured to decrypt an encrypted key and set the local parameter 121 defining the time at which the refrigeration appliance will be locked out based on the encrypted key Referring to FIGS. 2-4, in an exemplary embodiment, the appliance controller 117 is configured to generate one or more displays 210, 310, 410 on the user interface 127 that facilitate entry of the encrypted key and provide information about the operating status of the appliance 103. FIG. 2 provides an example of a user interface display 210 that that includes a lockout date display field 212 at which the user interface provides an indication of the time (e.g., date) when the appliance will automatically switch from the operating mode to the locked mode. The display further comprises a key entry selection item 214 that can be selected by a touchscreen input to call up a key entry display 310, shown in FIG. 3. A user can make touchscreen inputs to the user interface 127 on the display 310 to enter an encrypted key for locally changing the lockout time parameter 121 stored in the memory 119 of the appliance 103. As shown in FIG. 4, if the appliance 103 switches to the locked mode, in response to any activation of the user interface 127, the controller 117 will cause a lock screen display 410 to be displayed on the user interface, which provides an indication to the user that the appliance has been locked.

Referring again to FIG. 1, in the illustrated embodiment, the encrypted key for changing the lockout time parameter 121 is obtained from the remote encrypted key generator 109. The encrypted key generator generally comprises a processor configured to execute an encryption algorithm to generate the encryption key (e.g., based on instructions stored in memory accessible to the processor). In an exemplary embodiment, the encrypted key generator is connected to the internet so that one or more requester devices 111 (e.g., internet-connected personal computers or mobile devices) can request the encrypted key remotely using a web application. The encrypted key generator 109 is generally configured to receive from a requester device in a key request containing an updated lockout date for a particular refrigeration appliance 103. And in response, the encrypted key generator 109 is configured to generate an encrypted key that can be input to the user interface 127 to change the lockout time parameter 121 as described above. In an exemplary embodiment, the encrypted key generator 109 is configured to generate an encrypted key based on an algorithm that is a function of (i) an identifier of the particular refrigeration appliance 103 in question (e.g., a serial number), (ii) the updated lockout time, and (iii) the date on which the encrypted key will be entered into the user interface 127 of the appliance (typically, the current date). It will be understood that any suitable encryption algorithm that can generate an encrypted key based on any set or subset of the parameters (i)-(iii), alone or in combination with other input parameters, can be used without departing from the scope of the disclosure. The time change module 125 of the appliance 103 is pre-programed to decrypt the encrypted key generated by the encryption algorithm used by the encrypted key generator 109. Thus, in an exemplary embodiment, the local time change module 125 executes a decryption algorithm that is a function of the parameters (i)-(iii) to determine the updated lockout time and make the corresponding change to the lockout time parameter 121 stored in the appliance memory 119.

The illustrated refrigeration appliance 103 further comprises a network interface 131 configured to connect the refrigeration appliance to the client-server network 107 for communication with the remote asset management server 105. In the illustrated embodiment, the network interface 131 comprises a wireless transceiver such as a cellular data transceiver or a WiFi transceiver. Other types of network interfaces (e.g., hardwired internet ports, etc.) can also be used without departing from the scope of the disclosure. An exemplary embodiment of an asset management server and communications architecture for use in managing refrigeration appliances is described in greater detail in U.S. Pat. No. 9,863,694, which is hereby incorporated by reference in its entirety.

In an exemplary embodiment, a lessor ensures that each of its leased refrigeration appliances 103 is registered with an asset management application that runs on the asset management server 105. It will be understood that the "asset management server" could be a dedicated server system at a single location or distributed computing resources (e.g., a cloud-based system) capable of running the asset management application and communicating with the refrigeration appliances 103 over the client-server network 107. In certain embodiments, the lessor has an authenticated user or administrator account with the asset management application. In certain embodiments, registering the refrigeration appliance 103 with the asset management application comprises registering the appliance to the account of the lessor so that the lessor can enact administrator control over the control system 115 of each refrigeration appliance by issuing commands from the asset management server 105 to the refrigeration appliances 103 over the network 107.

Thus, the refrigeration appliance 103 is configured so that one or more authenticated users of the remote asset management server 105 can remotely control certain aspects of the appliance. In an exemplary embodiment, the asset management server can issue a command to the refrigeration appliance 104 via the network 107 to the network interface 131 that overwrites the lockout time parameter 121 stored in the memory 119. Suitably, the network interface passes the command to the appliance controller 117, which in turn changes the lockout time parameter 121 stored in the memory 119 to an updated lockout time based on the command from the asset management server 105. When the appliance 103 is pre-registered to the asset management server 105 as explained above, the refrigeration appliance 103 does not require an encrypted key from the asset management server 105 in order to overwrite the lockout time parameter 121 stored in the memory 119. It will be understood, however, that refrigeration appliances could require a command from a remote server to include an encrypted key before changing the lockout time parameter stored in the memory 119.

Exemplary methods of using the system 101 will now be described. Typically, the system 101 will be administered by a lessor of appliances in cooperation with the appliance lessees. When an appliance 103 is initially leased, the lessor will register the appliance to the asset management server 105 and deploy the appliance with a lockout time parameter 121 stored in the memory 119 that corresponds with the initial term for which the lessee has made payments under the appliance leasing agreement. Thus, at the time of initial deployment, the appliance 103 is configured to automatically switch from the operating mode to the locked mode when the initial payments on the lease expire. As explained more fully below, payment to extend the lease can be required to prevent the appliance from switching to the locked mode at the initial lockout time stored in the memory 119.

In the typical scenario, the appliance 103 will be deployed at a location where it can connect to the network 107. In these cases, the lessor requests payment from the lessee before the expiration of the initial paid term of the lease. Upon receiving payment to extend the paid term of the lease, the lessor sends a command from the asset management server 105 to the appliance 103 to adjust the lockout time parameter 121 stored in the memory 119. The controller 117 then updates the parameter 119, thereby adjusting the time at which the appliance 103 will automatically switch from the operating mode to the locked mode. If payment is not received by the time set by the parameter 121, the controller 117 automatically switches to the locked mode at the designated time. As explained above, use of the appliance is then restricted until the lessee makes payment on the lease. When further payment is received, the lessor can send a command from the asset management server 105 to the appliance 103 to update the lockout time parameter 121. This causes the controller 117 to switch from the locked mode to the operating mode, thereby unlocking the appliance for full-featured use. As can be seen, the illustrated asset management system 101 provides an automated mechanism for motivating a lessee to make lease payments without requiring the lessor to have physical access to the leased appliance.

Furthermore, the illustrated asset management system 101 can provide the same general mechanism for motivating lease payments, even in the event that network connection is unavailable or lost. In instances in which the lessor is not able to send direct commands to the leased appliance 103 over the network 107, the lessor can instead use the remote encrypted key generator 109 to allow the lessee to periodically extend the operating mode of the appliance after making payment. Again, the lessor can request payment from the lessee before the expiration of the initial paid term of the lease. Upon receiving payment to extend the paid term of the lease, instead of sending a command over the network 107, the lessor uses a requester device 111 to request an encrypted key from the encrypted key generator 109. For instance, the lessor provides the encrypted key generator with the serial number for the appliance 103 in question, along with the updated lockout date and the current date, and in response, the encrypted key generator 109 returns an encrypted key. The lessor then provides the encrypted key to the lessee, and the lessee inputs the encrypted key locally using the user interface 127. In response to receiving the encrypted key from the user interface 127, the lock control module 125 updates the lockout time parameter 121 stored in the memory to extend to the time at which the appliance will automatically switch to the locked mode.

It can be seen that the illustrated asset management system 101 provides a way for a lessor to restrict use of leased appliances when the lessees become delinquent on payment, even when direct physical access to the appliance is not possible. The inventors believe that this system 101 can substantially improve lease compliance and reduce the traditional burden imposed on lessors for ensuring compliance.

It is contemplated that asset management systems could employ other ways of locking appliances upon the expiration of a lease without departing from the scope or spirit of the present disclosure. For instance, in one or more embodiments, the lessor can deploy the appliances in an operating mode of indefinite duration and switch the appliance to the locked mode only when there is a breach of the lease. Using the illustrated asset management system 101, this methodology is possible by deploying the appliance 103 with lockout time parameter set to a null value which causes the controller 117 to run the appliance in the operating mode indefinitely. When a breach of the lease occurs, the lessor can send a command (broadly, a lock command) from the asset management server 105 over the network 107 to the appliance that adjusts the parameter 121 from the null value to a time value that corresponds to a current or past time. In response, the controller 117 will immediately switch the ice maker to the locked mode. Again, when compliance with the lease is restored (e.g., payment is made) the lessor can send an unlock command from the asset management server 105 over the network 107 to the appliance 103. The unlock command adjusts the parameter 121 back to the null value or to a future time value corresponding with the payments that have been made on the lease.

Although the illustrated embodiment uses the lockout time parameter 121 to switch between the operating mode and the locked mode, it is contemplated that other appliances could be configured differently without departing from the scope of the disclosure. For instance, instead of having a lockout time parameter 121, a controller could access one or more registers which define a toggle between at least an operating mode and a locked mode. In this scenario, the asset management server would be configured to send lock and unlock commands over the client server network that switch the toggle parameter(s) and thereby change the appliance between the locked mode and operating mode as directed.

As will be appreciated by one skilled in the art, aspects of the embodiments disclosed herein may be embodied as a system, method, computer program product or any combination thereof. Accordingly, embodiments of the disclosure may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium having computer usable program code embodied in the medium.

Aspects of the disclosure may be described in the general context of computer-executable or processor-executable instructions, such as program modules, being executed by a computer or processor. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present disclosure may be written in any combination of one or more programming languages, including, but not limited to, an object oriented programming language such as Java, Smalltalk, C++, C# or the like and conventional procedural programming languages, such as the "C" programming language or similar programming languages. The program code may execute entirely on the portable electronic device, partly on the portable electronic device or refrigeration appliance, as a stand-alone software package, partly on the portable electronic device and partly on a remote computer, or entirely on a remote computer or server. In the latter scenario, the remote computer may be connected to the portable electronic device through any type of network, including a local area network (LAN) or a wide area network (WAN), or the connection may be made to an external computer (for example, through the Internet using an Internet Service Provider).

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A refrigeration appliance for use under an appliance leasing agreement, the refrigeration appliance comprising:
   an appliance controller configured for selectively controlling the refrigeration appliance in an operating mode in which the appliance controller operates the refrigeration appliance for performing an appliance function and a locked mode in which the appliance controller prevents the refrigeration appliance from being operated to perform the appliance function; and
   memory storing a local parameter defining an initial lockout time at which the refrigeration appliance will be locked out from performing the appliance function;
   wherein the appliance controller is connected to the memory for reading the local parameter from the memory, the controller being configured to operate the refrigeration appliance in the operating mode until the lockout time and to switch the refrigeration appliance to the locked mode at the lockout time;
   the refrigeration appliance further comprising a lockout time change module, the lockout time change module being configured to receive a lockout time change input; wherein the lockout time change input comprises an encrypted key; wherein in response to receiving the lockout time change input, the lockout time change module is configured to execute a decryption algorithm to decrypt the encrypted key to determine an updated lockout time as a function of the encrypted key and update the local parameter stored in the memory to define the updated lockout time as when the appliance will be locked out from performing the appliance function.

2. The refrigeration appliance as set forth in claim 1, wherein the refrigeration appliance comprises a user interface and the lockout time change module is further configured to receive the lockout time change input based on an entry to the user interface.

3. The refrigeration appliance as set forth in claim 2, wherein the refrigeration appliance comprises a network interface configured to connect the refrigeration appliance to a client-server network for communication with a remote asset management server, wherein the refrigeration appliance is configured so that the remote asset management server can change the lockout time stored in the memory by sending a command over the client-server network to the network interface.

4. The refrigeration appliance as set forth in claim 1, wherein the encrypted key is a function of an identifier of the refrigeration appliance and the updated lockout time.

5. The refrigeration appliance as set forth in claim 4, wherein the encrypted key is also a function of a current date.

6. The refrigeration appliance as set forth in claim 1, wherein the refrigeration appliance comprises a network interface configured to connect the refrigeration appliance to a client-server network for communication with a remote asset management server, wherein the refrigeration appliance is configured so that the remote asset management server can change the lockout time stored in the memory by sending a command over the client-server network to the network interface.

7. A method of managing a leased appliance, the method comprising:

setting a local parameter on the leased appliance to automatically cause the appliance to switch from an operating mode to a locked mode at a time associated with an initial payment made under an appliance leasing agreement; and updating the local parameter to a time associated with a second payment made under the appliance leasing agreement after the second payment is made, wherein the leased appliance is the refrigeration appliance of claim 1.

8. A method of managing the refrigeration appliance of claim 1, the method comprising:

establishing a connection between the refrigeration appliance and the remote asset management server on a client-server network;

determining by the asset management server that a lease agreement governing the appliance has been broken; and in response to said determining, sending a lock command from the asset management server to the refrigeration appliance over the client-server network, the lock command being configured to cause a controller of the refrigeration appliance to switch from an operating mode to a locked mode.

9. The method as set forth in claim 8, further comprising determining that compliance with the lease agreement has been restored and, in response to determining that compliance with the lease agreement has been restored, sending an unlock command from the asset management server to the refrigeration appliance over the client-server network, the unlock command being configured to cause the controller to switch from the locked mode to the operating mode.

\* \* \* \* \*